G. PISSIMISIS & J. RIGOPULOS.
PROCESS AND APPARATUS FOR MAKING RESIN AND TURPENTINE.
APPLICATION FILED JULY 14, 1916.
1,219,998.
Patented Mar. 20, 1917.
2 SHEETS—SHEET 1.
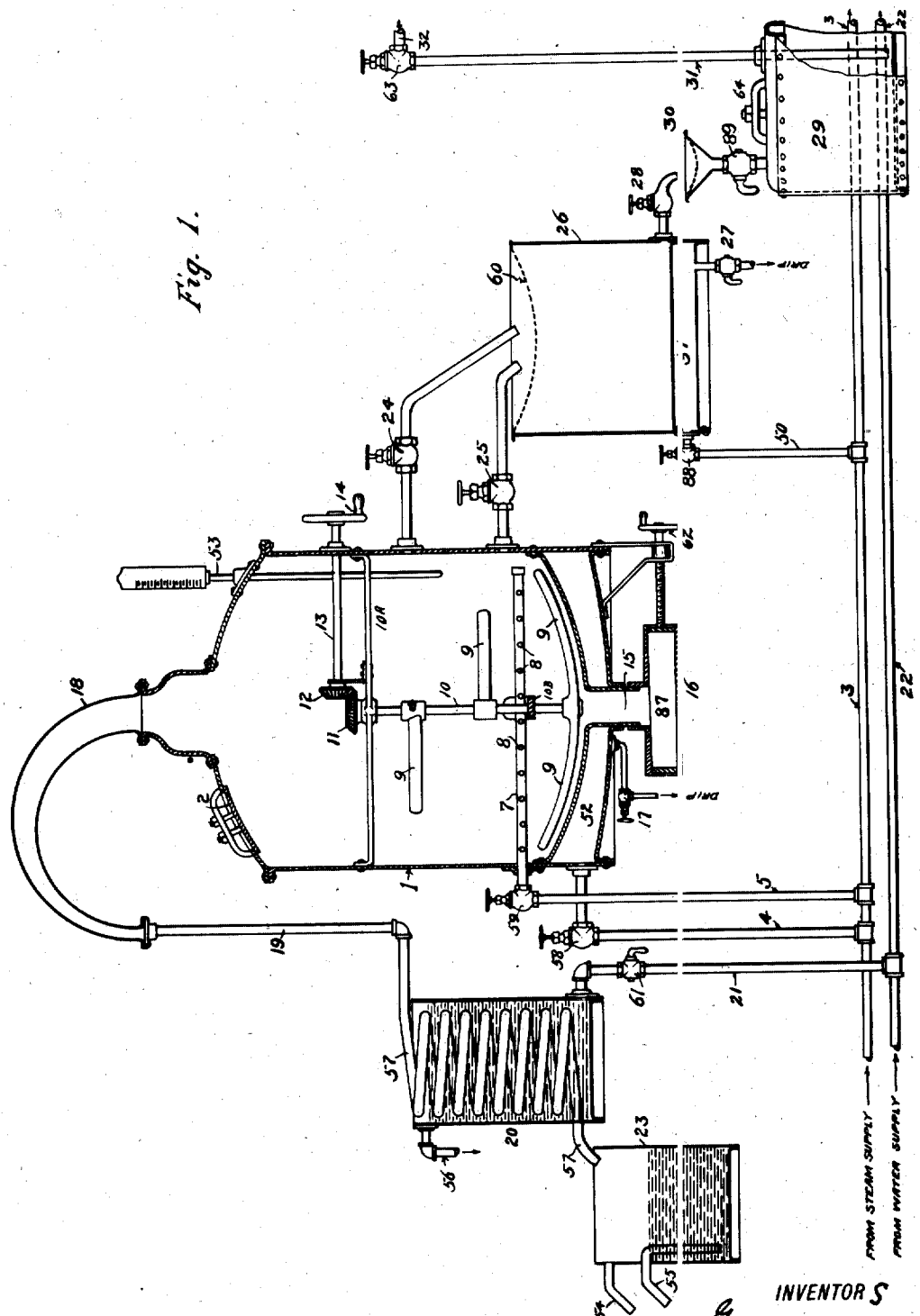

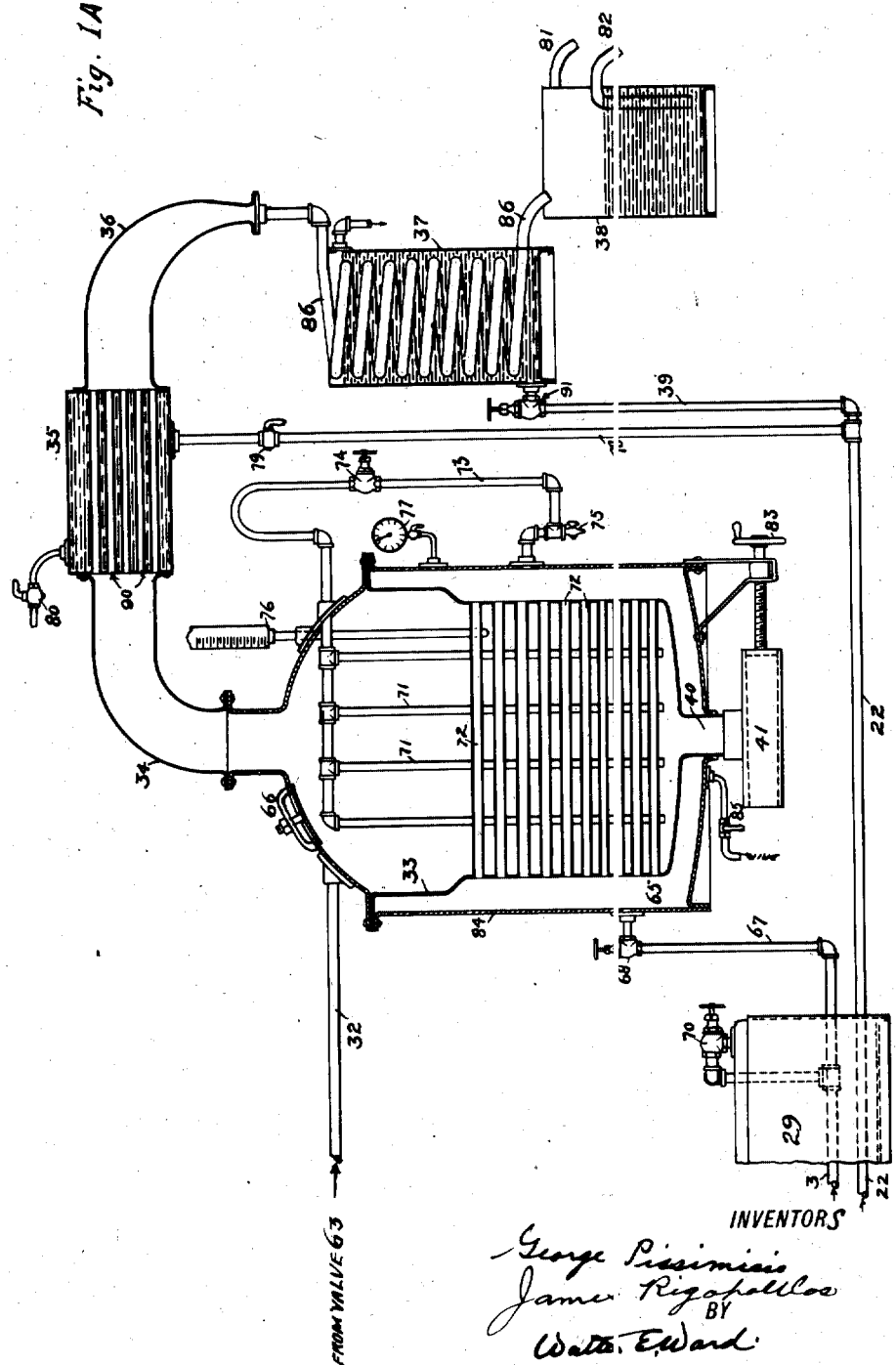

UNITED STATES PATENT OFFICE.

GEORGE PISSIMISIS AND JAMES RIGOPULOS, OF SCHENECTADY, NEW YORK, ASSIGNORS OF ONE-THIRD TO PETER CHIBOUCAS, OF ALBANY, NEW YORK.

PROCESS AND APPARATUS FOR MAKING RESIN AND TURPENTINE.

1,219,998. Specification of Letters Patent. Patented Mar. 20, 1917.

Application filed July 14, 1916. Serial No. 109,388.

*To all whom it may concern:*

Be it known that we, GEORGE PISSIMISIS and JAMES RIGOPULOS, citizens of the Kingdom of Greece, residing at the city of Schenectady, in the county of Schenectady and State of New York, have invented certain new and useful Improvements in Processes and Apparatus for Making Resin and Turpentine, of which the following is a specification.

Our invention relates to the manufacture of turpentine and resin, and the objects of our invention are to provide a simple and efficient system and machinery and apparatus for the manufacture of pure turpentine and resin which will be refined and free from any foreign substance, and at the same time be economical in the manufacture and in which the machinery and apparatus will be simple and easy of construction and operation.

We obtain these objects by means of the apparatus shown in the accompanying drawings, which consists of a side elevation of the apparatus, partly in section, showing the system of construction and use.

Figure 1$^A$ is a continuation of Fig. 1.

Similar numerals refer to similar parts throughout the several views.

Referring to Fig. 1 of the drawings:

1 is a tank or boiler into which the crude turpentine is placed; the tank 1 is provided with a double bottom so as to form a space 52 adapted to contain steam to heat the mass in the tank.

For the purpose of filling or cleaning, a suitable man hole 2 is provided at or near the top. In the interior of the tank is mounted, on suitable supports, 10$^A$—10$^B$; the shaft 10 carrying the blades 9—9 which are adapted to agitate the mass in the tank. The lower blades are preferably curved to conform to the contour of the tank bottom. On the upper end of the shaft 10 is mounted the bevel gear 11 adapted to engage the bevel gear 12 on the shaft 13. The shaft 13 being provided with the hand wheel 14, by which it may be operated. As thus arranged the blades may be caused to operate and stir the mass in the tank by turning the hand wheel 14. Inside the tank is also mounted a pipe or spur 7 provided with perforations 8—8.

Through the steam space 52 in the tank bottom is arranged the passage way 15 leading into a receptacle 16 provided with a tray 87. The tray 87 is preferably tapered and operated by the hand wheel and screw 62, or in any suitable manner, so that it can be forced into the receptacle 16 to make a tight fit and prevent leakage.

To heat the tank 1, and the mass therein, steam from pipe 3, connected with any source of supply, is conducted through the pipe 4 and control valve 58 into the space 52; space 52 is provided with a drip valve 17 to draw off condensations.

To add additional heat and moisture to the mass steam may be admitted from steam pipe 3 through pipe 5 and valve 59 into the spur 7 and thence through the ports 8—8 directly into the mass. Thus arranged, the crude turpentine is placed in the tank 1, steam supplied, and when the mass reaches the required temperature some of the turpentine in the mass will vaporize and pass through the tube 18 and pipe 19 into the condenser coil 57 and thence into the tank 23. At the same time steam is shut off at valve 59. The condenser coil is mounted in the tank 20; the tank 20 being arranged so as to be supplied with cold water from the cold water main 22 through pipe 21 and control cock 61. At or near the top of the tank is arranged an overflow 56.

The tank 23 is provided with a siphon pipe 55 and overflow 54.

The tank 1 is supplied with suitable gage or thermometer 53.

When the mass has ceased to vaporize the liquid contents are drawn off by means of valves and conductors 24—25 into the steam heated filter tank 26. The residue which settles to the bottom of the tank is drawn off through the passage way 15 into receptacle 16, as desired.

The tank 26 is provided with a filter screen 60 and is arranged to be heated by admitting steam from steam main 3 through pipe 50 and valve 88 into space 51 formed in bottom of tank 26. The space 51 is provided with a drip cock 27 to permit water of condensation being drawn off. The liquid in tank 26 is then drawn off through valve 28 and passed through the screened funnel 30 into tank 29.

Referring to Fig. 1$^A$:

After the liquid has been placed in tank 29 the cock 89, Fig. 1, is closed and steam admitted from the steam main 3 through the valve 70 into the top of the tank. The steam pressure will force the liquid through the pipe 31, which extends nearly to the bottom of tank and is open at its end, through the valve 63 and pipe 32, Fig. 1, into the tank 33. The tank 33 has an outer jacket 84 forming a steam space 65 and is provided with a plurality of flues 72—72 to provide additional heating surface that the liquid in the tank may be quickly raised to the right temperature. A thermometer 76 is provided to register the temperature. Steam from the steam main 3 is admitted by means of the pipe 67 and control valve 68 into the steam space 65 and flues 72—72. A gage 77 being provided to register the pressure in the steam space.

In order to further stimulate vaporization steam may be taken from the steam space 65 and admitted through the loop 73, valve 74, and spurs 71—71. A suitable drip cock 75 is provided at the bottom of the loop.

The vapor resulting will pass through the tube 34 into the tubes 90 in the cooling box 35, thence through the tube 36 into the condenser coil 86 in the tank 37, and thence into the tank 38.

Cooling tank 35 is supplied with water from water main 22 through pipe 78 and cock 79 and provided with overflow and control cock 80. Tank 37 is supplied with water from water main 22 through pipe 39 and control valve 91 and has an overflow at or near the top.

Tank 38 is similar to tank 23, having overflow 81 and siphon draw off 82.

The tank 29 has hand hole 64 for cleaning. Tank 33 has passage way 40 leading through steam space 65 into receptacle 41, which has a tray operated by a hand wheel 83 the same as receptacle under tank 1. Through this passage way 40 and receptacle 41 the resin is removed from the tank after the turpentine has been extracted.

The operation of our apparatus is as follows: The crude turpentine is deposited in tank 1, which is a melting boiler, wherein it is heated by injected steam and the mass agitated in a heated condition, as already described. When thus heated some of the turpentine will be vaporized and pass through cooling tanks and may be drawn off. This turpentine will only be a small quantity and of poor quality and color. When the crude turpentine is melted the steam is shut off from the mass in the boiler. The liquid is then drawn off from the other side of tank 1 through faucets located at different elevations in tank 1, the higher elevation is clearer and drawn off first while the impurities are settling to the bottom and drawn off through the outlet in the bottom. The liquid drawn from tank 1 passes through various filters into tank 29. The filters and tank receptacles are kept heated by steam pipes under them. Steam is then conducted into the top of tank 29 and forces the liquid from near the bottom of tank 29 through a pipe into the upper part of tank 33. The liquid is subjected to much more intense heat in tank 33 and the turpentine is vaporized and passes in the vaporized form from the top of the tank through a cooling system and condensed to a liquid form and collected in the liquid form in a final tank from which it is drawn off into receiving receptacles. The resin, in the meanwhile, settles in the bottom of tank 33 and is drawn off from the bottom of the tank.

When constructed in this way the turpentine and resin will be of the best quality, sparkling and free from any impurities or foreign matter. The machinery and apparatus required may be economically constructed and operated and without the use of lime water or oxygen or other chemicals will rapidly transform the crude turpentine into pure and refined turpentine and resin without loss in materials. Much more turpentine and resin may be manufactured by this system than in any other way and in much less time.

What we claim as our invention and desire to secure by Letters Patent is

1. The above described process of manufacturing refined turpentine and resin by placing the crude turpentine into a tank, heating the mass in the tank by injected steam, agitating the mass while in a heated condition within the said tank, drawing the liquid from the tank at different levels, filtering the liquid when drawn from the tank, forcing it by steam pressure applied to the upper surface of the liquid through conductors into another tank, while the liquid is still heated, reducing said liquid to vapor by steam heat in the second named tank, conveying the vapor from said second named tank through cooling apparatus whereby the same may be condensed again into liquid form, and taking the resin from the bottom of said last named tank through an opening in the bottom thereof.

2. In the manufacture of turpentine and resin, a tank adapted to receive the crude turpentine; a pipe adapted to convey steam into said tank; another pipe adapted to convey steam into a chamber under said tank; means for agitating the mass produced from crude turpentine within said tank; means for drawing the impurities from the bottom of said tank; a pipe adapted to conduct the vaporized product from the top of said tank into cooling receptacles; pipes adapted to convey products of said crude turpentine, when in a liquid form, through outlets at different elevations from said tank into a filter; another tank adapted to receive the liquid from said filter; means for forcing said liquid product from said last named tank into an auxiliary tank by steam pressing upon the upper surface of said liquid while in said filter; means for heating the fluid in said auxiliary tank; means adapted to carry the vapor from the top of said auxiliary tank through a system of coolers and into a final receptacle, substantially as described and for the purposes set forth.

In testimony whereof we affix our signatures.

GEORGE PISSIMISIS.
JAMES RIGOPULOS.